(12) United States Patent
Park

(10) Patent No.: US 8,482,433 B2
(45) Date of Patent: Jul. 9, 2013

(54) METHOD AND SYSTEM FOR PARKING ASSISTANCE AND RECOGNIZING OBSTACLE

(75) Inventor: Seung Bum Park, Gwacheon-si (KR)

(73) Assignee: Mando Corporation, Pyeongtaek-Si (KR)

( * ) Notice: Subject to any disclaimer, the term of this patent is extended or adjusted under 35 U.S.C. 154(b) by 491 days.

(21) Appl. No.: 12/873,619

(22) Filed: Sep. 1, 2010

(65) Prior Publication Data

US 2011/0057814 A1    Mar. 10, 2011

(30) Foreign Application Priority Data

Sep. 1, 2009    (KR) .......................... 10-2009-0081943

(51) Int. Cl.
*G08G 1/01* (2006.01)
*B60Q 1/00* (2006.01)
*G05D 1/00* (2006.01)
*A01B 69/06* (2006.01)
*G01S 13/00* (2006.01)
*B60S 9/205* (2006.01)

(52) U.S. Cl.
USPC ..... 340/935; 340/932.2; 340/943; 340/425.5; 701/1; 701/26; 701/28

(58) Field of Classification Search
USPC ........................................................ 340/943
See application file for complete search history.

(56) References Cited

U.S. PATENT DOCUMENTS

| | | | |
|---|---|---|---|
| 6,919,917 B1 * | 7/2005 | Janssen | 348/143 |
| 6,999,003 B2 * | 2/2006 | Matsukawa et al. | 340/932.2 |
| 2003/0004617 A1 * | 1/2003 | Kimura et al. | 701/1 |
| 2007/0055412 A1 * | 3/2007 | Bernhard | 701/1 |
| 2009/0118900 A1 * | 5/2009 | Adachi et al. | 701/35 |
| 2011/0022269 A1 * | 1/2011 | Nakazono et al. | 701/41 |
| 2011/0074604 A1 * | 3/2011 | Hsu et al. | 340/932.2 |

* cited by examiner

*Primary Examiner* — Jennifer Mehmood
*Assistant Examiner* — Fekadeselassie Girma
(74) *Attorney, Agent, or Firm* — McDermott Will & Emery LLP

(57) ABSTRACT

Disclosed are a system and method for recognizing an obstacle at the time of parking. The inventive system includes: at least one lateral side ultrasonic sensor for sensing lateral distance data between a user's vehicle and an obstacle positioned adjacent to a lateral side of the user's vehicle; a first course calculation unit for calculating lateral position data and a first course on the basis of the lateral distance data; at least one rear side ultrasonic sensor for sensing rear distance data indicating a distance between the user's vehicle and an obstacle positioned behind the rear side of the user's vehicle; a second course calculation unit for extracting rear position data for the obstacle positioned behind the user's vehicle on the basis of the rear distance data, and for extracting and calculating a final target parking position and a final course on the basis of the rear position data; and a control unit which receives information for the first course from the first course calculation unit so as to control the steering wheel of the user's vehicle, thereby moving the user's vehicle forward or backward along the first course, and receives information for the final target parking position and the final course from the second course calculation unit so as to control the steering wheel, thereby moving the user's vehicle is moved along the final course and automatically parked at the final target parking position.

5 Claims, 8 Drawing Sheets

FIG.3
(a)
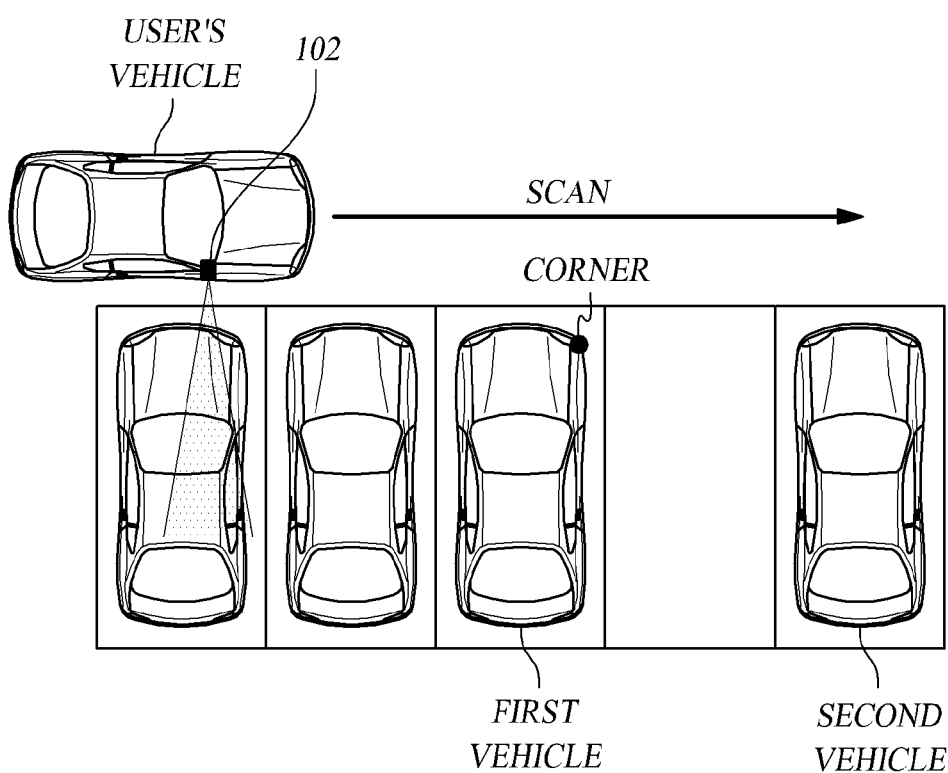
(b)
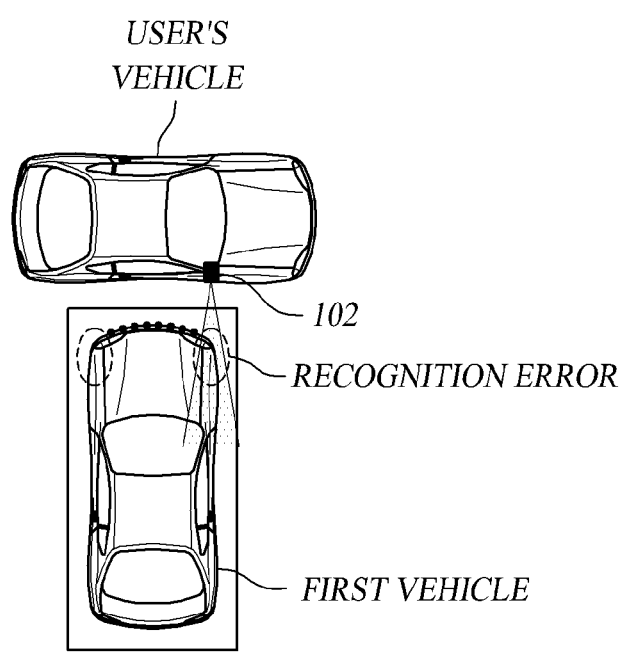

METHOD AND SYSTEM FOR PARKING ASSISTANCE AND RECOGNIZING OBSTACLE

BACKGROUND OF THE INVENTION

1. Field of the Invention

The present invention relates to a system and method for recognizing an obstacle at the time of parking. More particularly, the present invention relates to a system and method for recognizing an obstacle at the time of parking which re-performs space detection at the time of backward movement for parking so as to reduce errors caused in the process of detecting a parking space when parking is performed with the aid of one or more ultrasonic sensors.

2. Description of the Prior Art

As generally known in the art, a parking assist system is a system for assisting a vehicle driver to park a vehicle in a target parking space by recognizing the target parking space and one or more vehicles adjacent to the parking space, using ultrasonic sensors mounted on the lateral sides of the vehicle.

However, conventional parking support systems using ultrasonic waves, in particular, perpendicular parking support systems frequently fail to exactly recognize a corner of an obstacle due to the physical limits of ultrasonic measurement in the process of detecting a space available for perpendicular parking.

When ultrasonic waves are incident to a lateral side of a vehicle parked obliquely in relation to the propagation direction of ultrasonic waves from an ultrasonic sensor, ultrasonic data may be frequently lost since the reflected waves may not be returned to the ultrasonic sensor.

In addition, there is a problem in that since there is a limit in periodic scanning of ultrasonic waves produced by an ultrasonic sensor due to the limited velocity of the ultrasonic waves, it is difficult to recognize a corner of a vehicle through single-pass ultrasonic scanning.

Consequently, an error may be caused in recognizing a target parking position as a result of mistaken recognition for a corner of a vehicle.

SUMMARY OF THE INVENTION

Accordingly, the present invention has been made to solve the above-mentioned problems occurring in the prior art, and an object of the present invention is to provide a parking assist system which re-performs parking space detection using one or more ultrasonic sensors at the time of reverse parking so as to reduce errors caused in the process of performing parking space detection when parking is performed with the aid of ultrasonic sensors.

In order to accomplish this object, there is provided a system for recognizing an obstacle at the time of parking, wherein the system includes: at least one lateral side ultrasonic sensor for sensing lateral distance data between a user's vehicle and an obstacle positioned adjacent to a lateral side of the user's vehicle; a first course calculation unit for calculating lateral position data and a first course on the basis of the lateral distance data received from the lateral side ultrasonic sensor; at least one rear side ultrasonic sensor for sensing rear distance data indicating a distance between the user's vehicle and an obstacle positioned behind the rear side of the user's vehicle; a second course calculation unit for extracting rear position data for the obstacle positioned behind the user's vehicle on the basis of the rear distance data sensed by the rear side ultrasonic sensors, and for extracting and calculating a final target parking position and a final course on the basis of the rear position data; and a control unit which receives information for the first course from the first course calculation unit so as to control the steering wheel of the user's vehicle in such a manner that the user's vehicle is moved forward or backward along the first course, and receives information for the final target parking position and the final course from the second course calculation unit so as to control the steering wheel in such a manner that the user's vehicle is moved along the final course and automatically parked at the final target parking position.

In accordance with another aspect of the present invention, there is provided a method for recognizing an obstacle at the time of parking, wherein the method includes the steps of: sensing lateral distance data between a user's vehicle and an obstacle positioned adjacent to a lateral side of the user's vehicle; calculating lateral position data and a first course on the basis of the lateral distance data received from the lateral side ultrasonic sensor and; sensing rear distance data indicating a distance between the user's vehicle and an obstacle positioned behind the rear side of the user's vehicle; extracting rear position data for the obstacle positioned behind the user's vehicle on the basis of the rear distance data sensed by the rear side ultrasonic sensors, and extracting and calculating a final target parking position and a final course on the basis of the rear position data; and receiving information for the first course from the first course calculation unit so as to control the steering wheel of the user's vehicle in such a manner that the user's vehicle is moved forward or backward along the first course, and receiving information for the final target parking position and the final course from the second course calculation unit so as to control the steering wheel in such a manner that the user's vehicle is moved along the final course and automatically parked at the final target parking position.

BRIEF DESCRIPTION OF THE DRAWINGS

The above and other objects, features and advantages of the present invention will be more apparent from the following detailed description taken in conjunction with the accompanying drawings, in which:

FIG. 3a shows a lateral side ultrasonic sensor performing scanning so as to determine whether a parkable area exists or not while a user's vehicle is passing by a parking area;

FIG. 3b shows the lateral side ultrasonic sensor recognizing a corner of a previously parked vehicle which is positioned to be difficult to be recognized by an ultrasonic sensor while the user's vehicle is being moved;

DETAILED DESCRIPTION OF THE PREFERRED EMBODIMENTS

Figure 1:
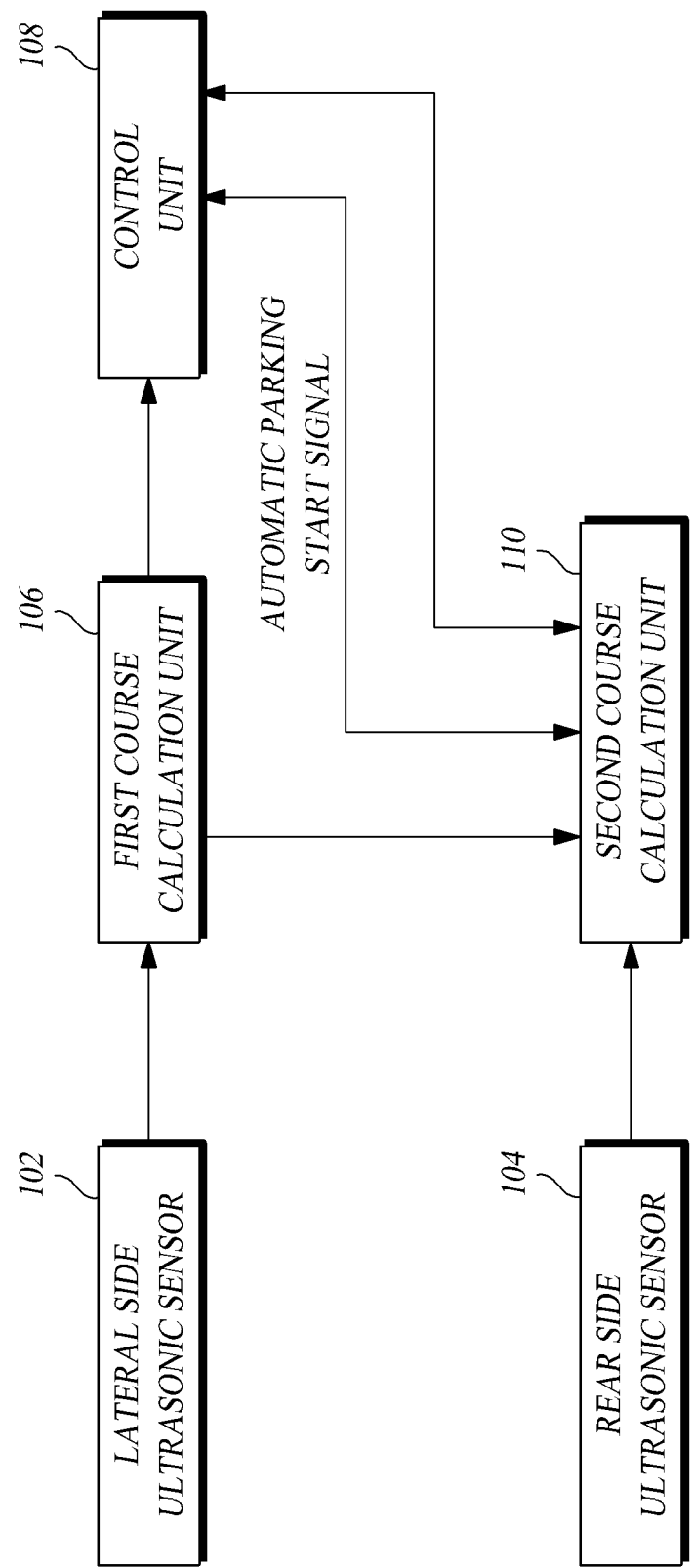
FIG. 1 shows a system for recognizing an obstacle at the time of parking in accordance with an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 shows a system for recognizing an obstacle at the time of parking in accordance with an embodiment of the present invention.

As shown in FIG. 1, a system for recognizing an obstacle at the time of parking in accordance with an embodiment of the present invention includes at least one lateral side ultrasonic sensor 102, a plurality of rear side ultrasonic sensors 104, a first course calculation unit 106, a control unit 108, and a second course calculation unit 110.

The lateral side ultrasonic sensor 102 senses lateral distance data between a user's vehicle and a lateral obstacle (a previously parked vehicle) positioned beside the user's vehicle while the user's vehicle is being driven.

The rear side ultrasonic sensors 104 sense rear distance data indicating a distance between the rear side ultrasonic sensors 104 mounted on the rear side of the user's vehicle and a rear obstacle positioned behind the user's vehicle. The number of the rear side ultrasonic sensors 104 should be at least two so as to detect the position of an object through triangulation.

Here, the lateral obstacle and the rear obstacle may be a parked vehicle or a structure, such as a building. For the purpose of easy description, the obstacles may be referred to as a parked vehicle(s).

The first course calculation unit 106 receives the lateral distance data from the lateral ultrasonic sensor 102, and calculates lateral position data and a first course, wherein the first course is a course for the user's vehicle to be moved backward when the automatic parking of the vehicle is performed. The calculation of the first course by the first course calculation unit 106 may be executed in such a manner that after a parkable position is detected so as to determine that there is a parkable space, the first course can be calculated so that the user's vehicle is accessible to the parkable space by being moved backward along the first course. If the parkable space is detected, the detection result may be notified to the driver of the user's vehicle by sound or visual display.

Meanwhile, the process of automatic parking the user's vehicle consists of a first step (moving backward), a second step (moving forward), and a third step (moving backward again).

The control unit 108 firstly renders the first step (backward movement) to be executed in the automatic parking process. The control unit 108 receives information for the first course from the first course calculation unit 106. For example, if an automatic parking start signal is produced as the driver pushes an automatic parking button, the control unit 108 receives the signal, and if the automatic parking is started and the first step (backward movement) of the automatic parking process is started, the control unit 108 receives the information for the first course from the first course calculation unit. While the automatic parking is being performed by the driver's pressing of the accelerator pedal and the brake pedal as the user's vehicle is moved backward, the control unit 108 controls the steering wheel of the user's vehicle. Although it is assumed that the driver presses the accelerator pedal and the brake pedal when the user's vehicle is moved backward in the present embodiment, the backward movement of the user's vehicle can be performed with the aid of an automatic brake system and an automatic drive system.

For example, the second course calculation unit 110 may receive an automatic parking start signal, which is produced when the driver pushes an automatic parking button. Using the rear distance data sensed by the rear side ultrasonic, the second course calculation unit 110 extracts rear position data of a vehicle parked behind the user's vehicle, and determines the final target parking position and the final course. Although it has been described herein that the final target parking position and the final course are calculated by receiving an automatic parking start signal, the present invention is not limited to this. For example, the final target parking position and the final course may be calculated by receiving a backward movement start signal from the control unit 108.

When calculating the final target parking position and the final course, the second course calculation unit 110 may use the rear position data only, or may use both of the lateral position data and the rear position data.

The control unit 108 receives the final target parking position and the final course from the second course calculation unit 110, and controls the steering wheel when the automatic parking is performed through the second step (forward movement) and the third step (re-performed backward movement) as the driver presses the accelerator pedal and the brake pedal, so that the user's vehicle can be moved along the final course and automatically parked at the final target parking position. Although it is described that the user's vehicle is re-performed backward movement after it is moved forward in the present embodiment, the user's vehicle may be automatically parked by being continuously moved backward without performing the forward movement.

How an automatic parking system controls a steering wheel so as to allow a user's vehicle to be moved along a set course and to be parked at a target parking position is well known in the art. Therefore, it will not be described in detail.

Another embodiment of the present invention will be described with reference to perpendicular parking by way of an example.

Figure 2:
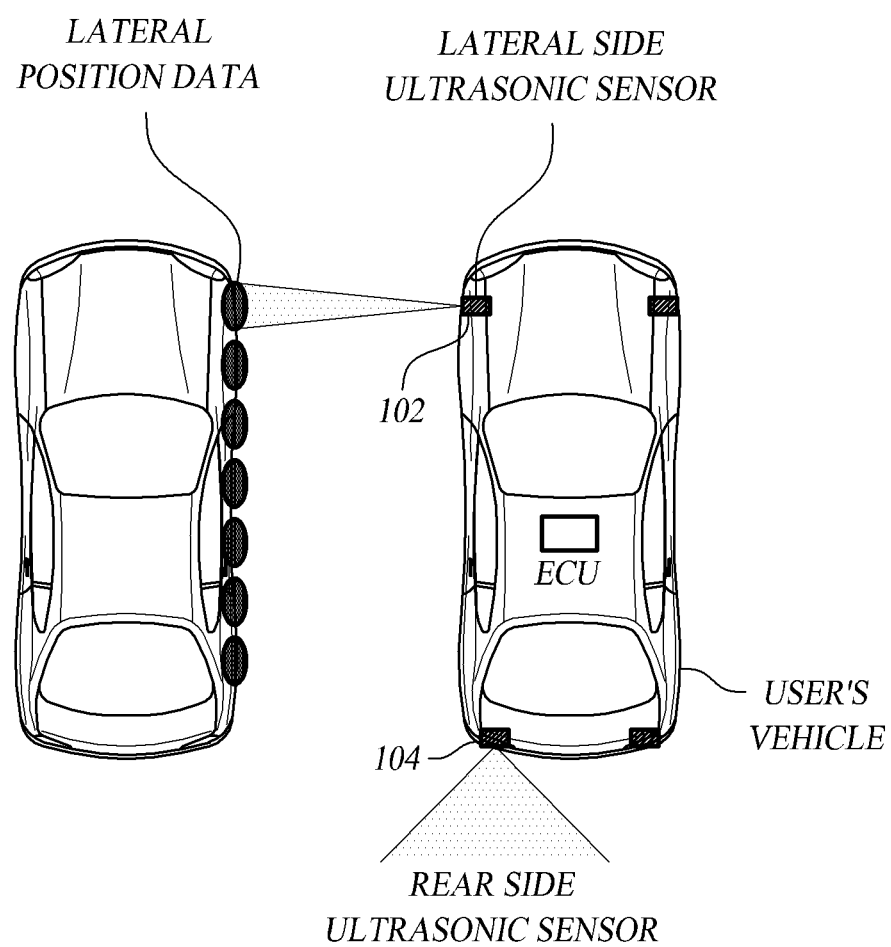
FIG. 2 shows lateral side ultrasonic sensors and rear side ultrasonic sensors mounted on a vehicle in a system for recognizing an obstacle at the time of parking in accordance with an embodiment of the present invention.

FIG. 2 shows lateral side ultrasonic sensors and rear side ultrasonic sensors mounted on a vehicle in a system for recognizing an obstacle at the time of parking in accordance with an embodiment of the present invention.

As shown in FIG. 2, the lateral side ultrasonic sensors 102 may be installed on the left and right sides of the user's vehicle, and the rear side ultrasonic sensors 104 may be installed on the rear side of the user's vehicle. It is assumed that the lateral side ultrasonic sensors 102 and the rear side ultrasonic sensors 104 are ultrasonic sensors which emit ultrasonic waves and receive the ultrasonic waves so as to measure the distance from an obstacle to the sensors. Meanwhile, in the present embodiment, the number of the rear side ultrasonic sensors 104 is two.

Due to the characteristic of ultrasonic waves, one ultrasonic sensor can sense a distance from the user's vehicle to an obstacle, but cannot sense the position of the obstacle. However, in the present embodiment, each of the lateral side ultrasonic sensors 102 retains an emission angle so narrow that ultrasonic waves can be emitted only when the lateral side ultrasonic sensor 102 is within a predetermined angular range. As a result, it is possible to determine lateral position data within a predetermined position error range by using the sensed distance data. In the present embodiment, the ultrasonic wave emission angle of each of the lateral side ultrasonic sensors 102 is tuned to be ±9° with reference to the lateral side of the user's vehicle on which it is mounted.

Therefore, by receiving input from a lateral side ultrasonic sensor, it is possible to calculate lateral position data from the sensed lateral distance data, wherein the calculated lateral position data has a precision corresponding to the ultrasonic waves' projected extent on a vehicle parked adjacent to the user's vehicle, the ultrasonic waves being in the range of ±9° with reference to the lateral side of the user's vehicle on which the lateral side ultrasonic sensor is mounted.

FIG. 3a shows a lateral side ultrasonic sensor performing scanning so as to determine whether a parkable area exists or not while a user's vehicle is passing by a parking area, FIG. 3b shows the lateral side ultrasonic sensor recognizing a corner of a previously parked vehicle which is positioned to be difficult to be recognized by an ultrasonic sensor while the user's vehicle is being moved.

As shown in FIG. 3a, distance data can be sensed through scanning with a lateral side ultrasonic sensor while the user's vehicle is passing by a previously parked vehicle, and the parked vehicle and an empty parking space can be recognized by the first course calculation unit 106 on the basis of the distance data.

However, as shown in FIG. 3b, it is difficult to sense a corner of the parked vehicle due to the characteristic of the ultrasonic sensor. If automatic parking is performed only on the basis of the data sensed when scanning is performed by the lateral side ultrasonic sensor 102 as described above, the user's vehicle may come into contact with or run into the parked vehicle due to an error caused in setting a target parking region.

When the incident angle of ultrasonic waves incident to a round area of a vehicle from an ultrasonic sensor, which may be employed as the lateral side ultrasonic sensors 102 or the rear side sonic sensors 104, is not more than 15 to 20 degrees, the ultrasonic waves are not returned to the ultrasonic sensor. For example, if a parked vehicle is sensed by performing scanning using ultrasonic waves every 3 ms while the user's vehicle is being driven at a predetermined velocity, the measurement resolution is very poor since the distance between the user's vehicle and the parked vehicle is measured about every 30 cm of driven distance. Beyond the poor recognizing property for a curved area of a parked vehicle, such an ultrasonic sensor is characterized by poor resolution and many noises. Due to such defects, the recognition of a corner area of a parked vehicle by means of the lateral ultrasonic sensor 102 during the movement of the user's vehicle is very poor in terms of precision.

Figure 4:
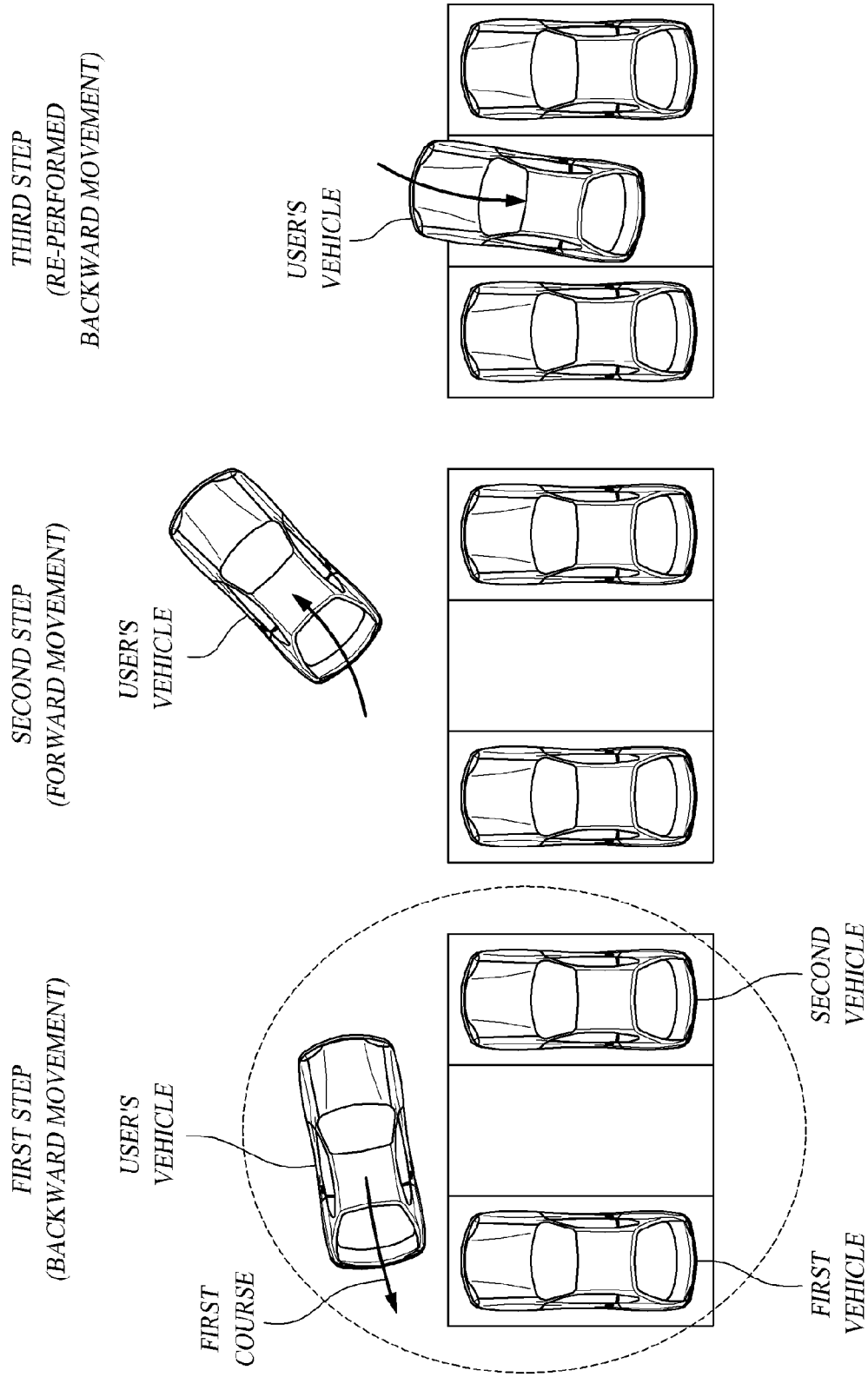
FIG. 4 shows an automatic parking process performed in three steps.

FIG. 4 shows an automatic parking process performed in three steps.

As shown in FIG. 4, a parking region is scanned by a lateral side ultrasonic sensor 102 so as to recognize a target parking position, and then if automatic parking is started by a user's pushing of an automatic parking button or the like, automatic parking is performed through the backward movement of the first step, the forward movement of the second step, and the re-performed backward movement of the third step.

Figure 5:
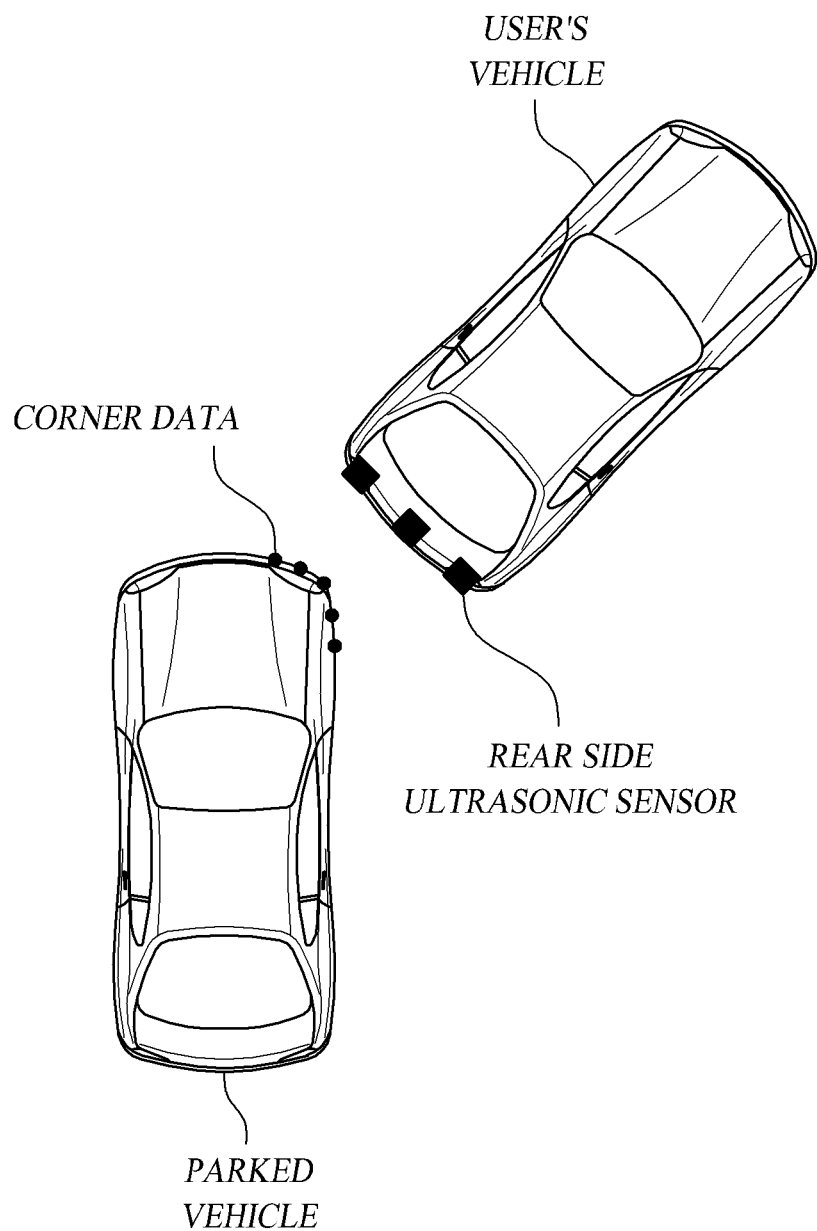
FIG. 5 shows the arranged state of the user's vehicle in relation to a previously parked vehicle and corner data (second data) acquired while the backward movement of the first step is being performed after automatic parking has been started.

FIG. 5 shows the arranged state of the user's vehicle in relation to a previously parked vehicle and corner data (second data) acquired while the backward movement of the first step is being performed after automatic parking has been started.

As shown in FIG. 5, at the time of backward movement of the user's vehicle which is the first automatic parking step, space detection is performed once again by a plurality of rear side ultrasonic sensors 104, whereby a corner data of a first parked vehicle can be acquired.

When the automatic parking is started and the first step backward movement of the user's vehicle is performed, it is possible to recognize the corner of the first parked vehicle positioned behind the user's vehicle by using the rear side ultrasonic sensors 104 mounted on the rear side of the user's vehicle. Triangulation may be used when the rear side ultrasonic sensors 104 recognize the corner of the first parked vehicle.

By emitting ultrasonic waves over a relatively wide emission angle, the rear side ultrasonic sensors 104 can sense data over a wide area. If the emission angle of each rear side ultrasonic sensor 104 is set to ±50° about its central axis, it is possible to sense wider distance data. However, the wider distance data cannot be employed as position data since the error of the distance data is too large. Therefore, it is possible to extract position data if a plurality of rear side ultrasonic sensors 104 are used and triangulation is executed for all the distance data individually sensed by the rear side ultrasonic sensors 104.

Figure 6:
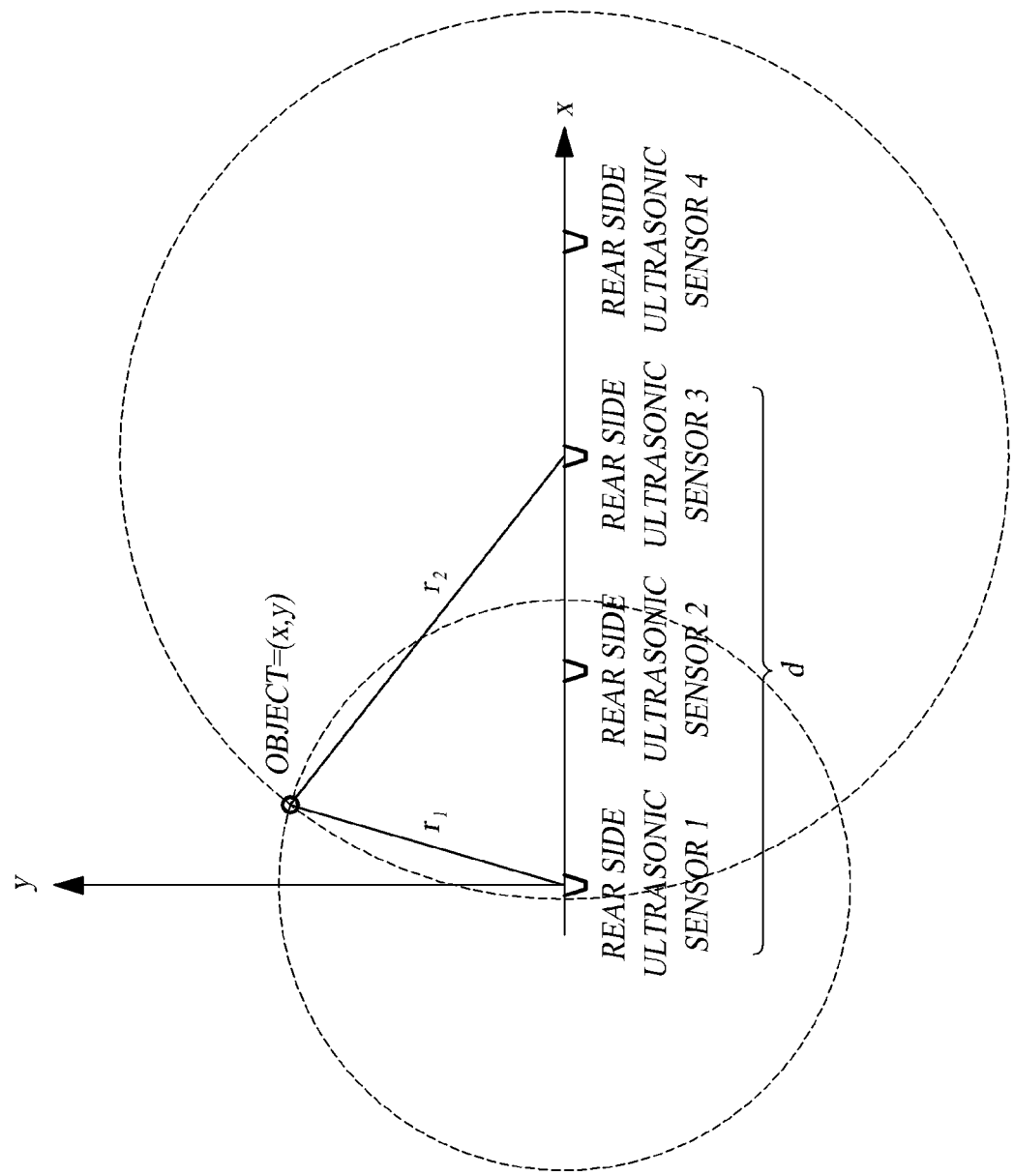
FIG. 6 exemplifies a distance measurement method by triangulation.

FIG. 6 exemplifies a distance measurement method by triangulation.

As exemplified in FIG. 6, if r1, r2 and d are known, x- and y-coordinates can be calculated by triangulation. Since the methods of calculating x- and y-coordinates are well-known, its detailed description will be omitted.

Therefore, if the data sensed by two rear side ultrasonic sensors 104 are used, the position of a sensed object can be determined. Therefore, by simultaneously receiving signals returned to the two rear side ultrasonic sensors 104 from an obstacle after the rear side ultrasonic sensors 104 emitted ultrasonic waves to the obstacle, and then calculating the position of the obstacle, it is possible to grasp the position data for the obstacle positioned behind the user's vehicle.

Figure 7:
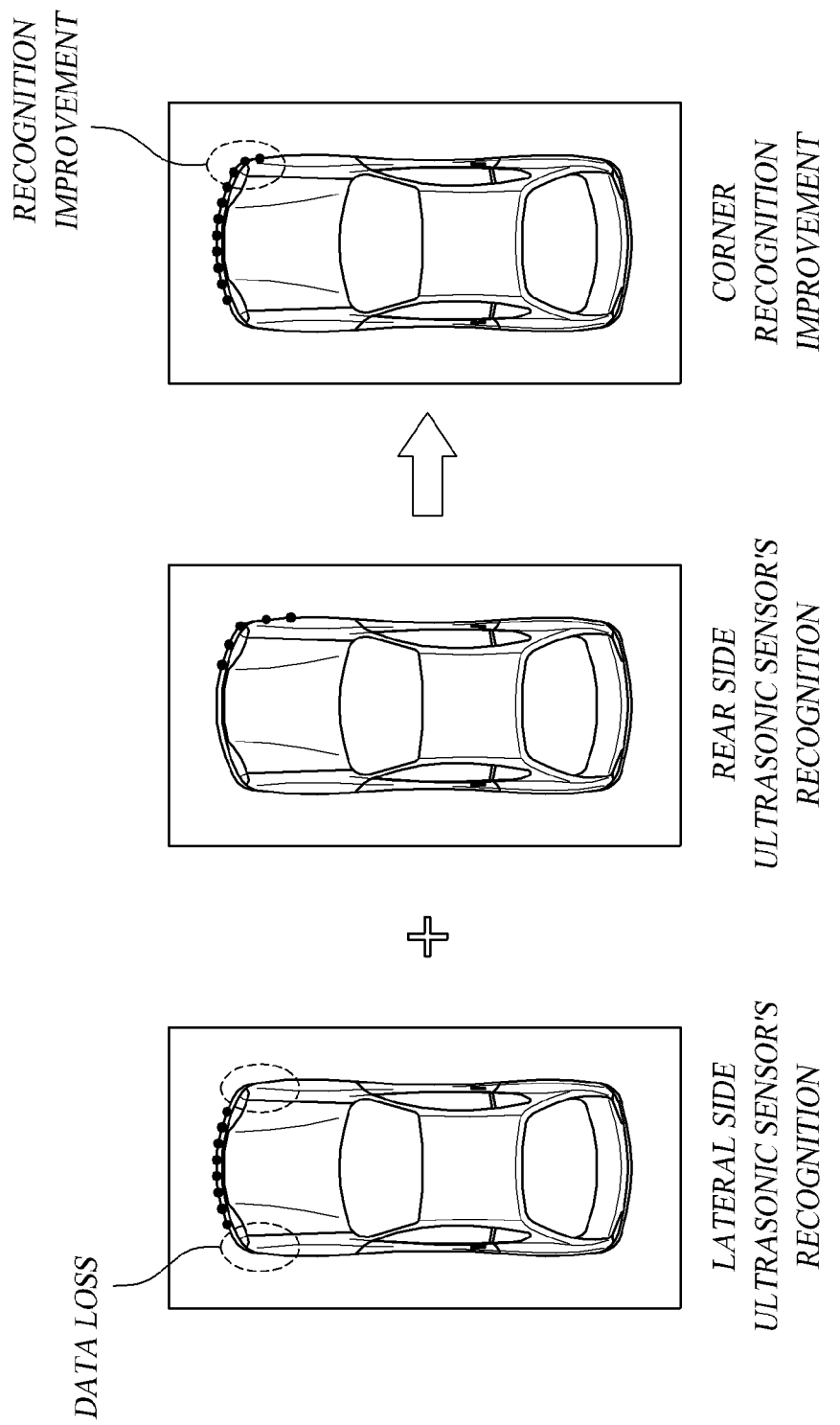
FIG. 7 shows recognized vehicle data improved by combining recognized vehicle data sensed by a lateral side ultrasonic sensor and recognized vehicle data sensed by two rear side ultrasonic sensors.

FIG. 7 shows recognized vehicle data improved by combining recognized vehicle data sensed by a lateral side ultrasonic sensor and recognized vehicle data sensed by two rear side ultrasonic sensors.

As shown in FIG. 7, upon combining the lateral position data extracted by using the recognized vehicle data sensed by any of the lateral side ultrasonic sensors, and the rear position data extracted by using the recognized vehicle data sensed by the rear side ultrasonic sensors, it is possible to recognize the entire position data covering a corner of the vehicle.

If it becomes impossible to recognize the final target parking position after the second course calculation unit 110 recognized the entire position data, the automatic parking may be interrupted and the current status may be notified to the driver of the user's vehicle.

Figure 8:
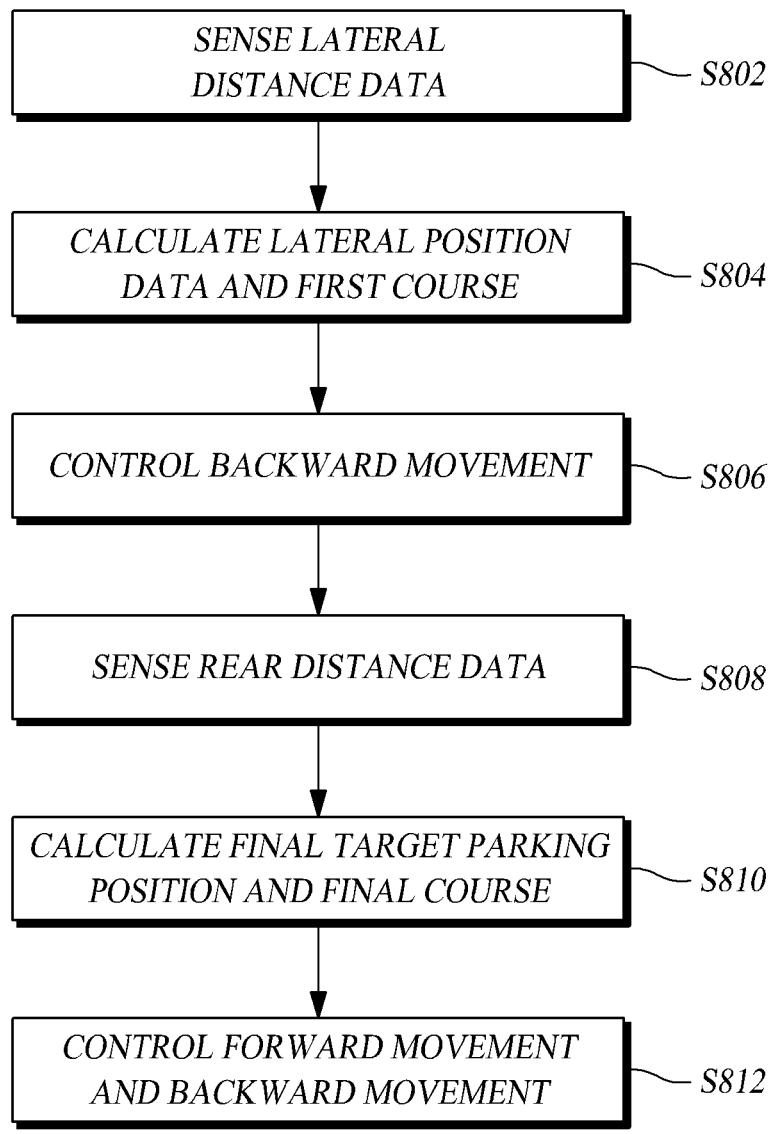
FIG. 8 is a flowchart showing a method for recognizing an obstacle.

FIG. 8 is a flowchart showing a method for recognizing an obstacle.

Now, description will be made with reference to FIGS. 1 to 8.

As shown in FIG. 8, a method for recognizing an obstacle in accordance with an embodiment of the present invention includes the steps of: sensing lateral position data (S802), calculating lateral position data and a first course (S804), controlling backward movement (S806), sensing lateral distance data (S808), calculating the final target parking position and the final course (S810), and controlling forward and re-performed backward movements (S812).

In the step of sensing the lateral distance data (S802), any of the lateral ultrasonic sensors 102 senses lateral distance data for a lateral obstacle (which may be a previously parked vehicle) positioned beside the user's vehicle.

In the step of calculating the lateral position data and the first course (S804), the first course calculation unit 106 receives the lateral distance data and calculates the lateral position data and the first course.

In the step of controlling the backward movement (S806), the control unit 108 receives an automatic parking start signal, and receives information for the first course from the first course calculation unit 106. Then, the control unit 108 controls the steering wheel of the user's vehicle so that the user's vehicle is moved backward along the first course.

In the step of sensing the rear distance data (S808), the rear side ultrasonic sensors 104 sense the lateral distance data for a rear obstacle (which may be a previously parked vehicle) positioned behind the user's vehicle while the user's vehicle is being moved backward.

In the step of calculating the final target parking position and the final course (S810), the second course calculation unit 110 receives the rear distance data and extracts the rear position data for the previously parked vehicle, and calculates the final target parking position and the final course using the lateral position data and the rear position data.

In the step of controlling the forward and re-performed backward movements (S812), the control unit receives information for the final target parking position and the final course, and controls the steering wheel of the user's vehicle so that the user's vehicle is moved forward and then backward, thereby being automatically parked at the final target parking position. Although it is described that the user's vehicle is moved forward and then backward in the present embodiment, the user's vehicle may be continuously moved backward, thereby being automatically parked, without being moved forward.

In accordance with the present invention, when parking the user's vehicle using ultrasonic sensors, space detection is re-performed at the time of moving the user's vehicle backward for parking so as to reduce errors caused in the process of detecting a parking space using an ultrasonic sensor. As a result, the error probability at the time of recognizing a target parking position can be reduced.

In addition, since inexpensive ultrasonic sensors can be more frequently used in automatic parking in accordance with the present invention, the industrial applicability of the present invention can be increased.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A system for recognizing an obstacle at the time of parking, wherein the system comprises:
   at least one lateral side ultrasonic sensor for sensing lateral distance data between a user's vehicle and an obstacle positioned adjacent to a lateral side of the user's vehicle;
   a first course calculation unit for calculating lateral position data and a first course on the basis of the lateral distance data received from the lateral side ultrasonic sensor;
   at least one rear side ultrasonic sensor for sensing rear distance data indicating a distance between the user's vehicle and an obstacle positioned behind the rear side of the user's vehicle;
   a second course calculation unit for extracting rear position data for the obstacle positioned behind the user's vehicle on the basis of the rear distance data sensed by the rear side ultrasonic sensors, and for extracting and calculating a final target parking position and a final course on the basis of the rear position data; and
   a control unit which receives information for the first course from the first course calculation unit so as to control the steering wheel of the user's vehicle in such a manner that the user's vehicle is moved forward or backward along the first course, and receives information for the final target parking position and the final course from the second course calculation unit so as to control the steering wheel in such a manner that the user's vehicle is moved along the final course and automatically parked at the final target parking position.

2. The system as claimed in claim 1, wherein the second course calculation unit extracts the rear position data of the rear obstacle by triangulation on the basis of the rear distance data received from the rear ultrasonic sensors.

3. The system as claimed in claim 1, wherein the second course calculation unit extracts and calculates the final target parking position and the final course on the basis of the lateral position data and the rear position data.

4. The system as claimed in claim 1, wherein the control unit receives an automatic parking start signal, and receives information for the first course from the first course calculation unit.

5. A method for recognizing an obstacle at the time of parking, wherein the method includes the steps of:
  sensing lateral distance data between a user's vehicle and an obstacle positioned adjacent to a lateral side of the user's vehicle;
  calculating lateral position data and a first course on the basis of the lateral distance data received from the lateral side ultrasonic sensor and;
  sensing rear distance data indicating a distance between the user's vehicle and an obstacle positioned behind the rear side of the user's vehicle;
  extracting rear position data for the obstacle positioned behind the user's vehicle on the basis of the rear distance data sensed by the rear side ultrasonic sensors, and extracting and calculating a final target parking position and a final course on the basis of the rear position data; and
  receiving information for the first course from the first course calculation unit so as to control the steering wheel of the user's vehicle in such a manner that the user's vehicle is moved forward or backward along the first course, and receiving information for the final target parking position and the final course from the second course calculation unit so as to control the steering wheel in such a manner that the user's vehicle is moved along the final course and automatically parked at the final target parking position.

* * * * *